US009614661B2

(12) United States Patent
Roeper et al.

(10) Patent No.: US 9,614,661 B2
(45) Date of Patent: Apr. 4, 2017

(54) DIFFERENTIAL INTERFACE FOR INTER-DEVICE COMMUNICATION IN A BATTERY MANAGEMENT AND PROTECTION SYSTEM

(75) Inventors: Wolfgang Roeper, Neuenstein (DE); Hendrik Ahlendorf, Dresden (DE); Friedemann Schmidt, Asperg (DE)

(73) Assignee: Atmel Corporation, San Jose, CA (US)

( * ) Notice: Subject to any disclaimer, the term of this patent is extended or adjusted under 35 U.S.C. 154(b) by 1396 days.

(21) Appl. No.: 13/442,502

(22) Filed: Apr. 9, 2012

(65) Prior Publication Data

US 2013/0264881 A1 Oct. 10, 2013

(51) Int. Cl.
| H02J 7/00 | (2006.01) |
| H04L 7/033 | (2006.01) |
| H04L 7/02 | (2006.01) |
| H04L 25/02 | (2006.01) |
| H04L 25/49 | (2006.01) |

(52) U.S. Cl.
CPC .............. H04L 7/033 (2013.01); H04L 7/02 (2013.01); *H02J 7/00* (2013.01); *H04L 25/0282* (2013.01); *H04L 25/0294* (2013.01); *H04L 25/4904* (2013.01); *Y10T 307/685* (2015.04)

(58) Field of Classification Search
CPC ........................................................ H02J 7/00
USPC ............................................................. 307/77
See application file for complete search history.

(56) References Cited

U.S. PATENT DOCUMENTS

| 4,709,318 | A | * | 11/1987 | Gephart et al. ................. 363/37 |
| 5,719,856 | A | * | 2/1998 | May ........................... H04B 1/58 370/282 |
| 6,121,751 | A | * | 9/2000 | Merritt .................. H02J 7/0018 320/116 |
| 6,624,612 | B1 | * | 9/2003 | Lundquist ......... H01M 10/4207 320/118 |
| 7,228,509 | B1 | * | 6/2007 | Dada ..................... G06F 17/505 716/102 |
| 7,315,187 | B2 | * | 1/2008 | Laulanet ............. H03K 5/2472 327/65 |
| 2006/0171477 | A1 | * | 8/2006 | Carballo ............. H04L 25/0272 375/257 |
| 2007/0045659 | A1 | * | 3/2007 | Abe ...................... G09G 3/3688 257/152 |

(Continued)

OTHER PUBLICATIONS

Atmel Corporation, "Li-Ion, NiMH Battery Measuring, Charge Balancing and Power-supply Circuit," Atmel ATA6870, 9116D-Auto—Mar. 2011, pp. 1-55 (2011).

(Continued)

*Primary Examiner* — Rexford Barnie
*Assistant Examiner* — Joseph Inge
(74) *Attorney, Agent, or Firm* — Fish & Richardson P.C.

(57) ABSTRACT

A multi-cell battery stack includes a microcontroller and a string of battery management and protection IC devices connected to one another in a daisy chain configuration. Each battery management and protection IC device can include a communication interface circuit includes pairs of differential input signal lines, receivers including respective current comparator circuits to receive differential signals on the differential input signal lines, and transmitters to provide outgoing differential signals on the differential input signal lines. A digital circuit block allows signals to pass between the receivers and transmitters.

11 Claims, 8 Drawing Sheets

(56) References Cited

U.S. PATENT DOCUMENTS

| | | | | |
|---|---|---|---|---|
| 2007/0182377 A1* | 8/2007 | Vandensande | ..... | G01R 31/3658 320/132 |
| 2008/0143543 A1* | 6/2008 | Vandensande | ....... | G01R 31/362 340/636.1 |
| 2008/0238432 A1* | 10/2008 | Botker | ............... | G01R 31/3658 324/434 |
| 2009/0212825 A1* | 8/2009 | Maone | ............................ | 327/52 |
| 2010/0250820 A1* | 9/2010 | Gaalaas | .............. | G06F 13/4072 710/305 |
| 2010/0289497 A1* | 11/2010 | Lum-Shue-Chan | | G01R 31/3658 324/426 |
| 2013/0187611 A1* | 7/2013 | Suzuki | ................ | B60L 11/1866 320/118 |

OTHER PUBLICATIONS

Intersil Selection Guide, Automotive Products, Certified Management System, 3 pages, (Q3/Q4 2011).
Linear Technology Corporation, LTC6803-I/LTC6803-3, "Multicell Battery Stack Monitor," pp. 1-40 (2011).
Maxim Integrated Products "12-Channel, High-Voltage Sensor, Smat Data-Acqusition Interface," MAX11068, p. 182 (2010).

* cited by examiner

DIFFERENTIAL INTERFACE FOR INTER-DEVICE COMMUNICATION IN A BATTERY MANAGEMENT AND PROTECTION SYSTEM

BACKGROUND

This disclosure relates to an interface for inter-device communication in a battery management and protection system.

Some devices and systems, such as hybrid electrical vehicles, use multi-cell battery stacks. Such battery stacks may include, for example, battery cells coupled to one or more integrated circuit (IC) chips. The chips typically include a controller (e.g., a microcontroller) and circuitry and provide, among other things, battery cell management and protection.

In applications that require or use multiple IC devices to handle the battery cells, the IC devices may be connected to a microcontroller in a daisy chain configuration communication. The interfaces in the daisy chain configuration sometimes are connected to one another using relatively long (e.g., one meter) unshielded wires. In some applications such as the automotive environment, high noise levels can be injected into the wires and cause interference.

SUMMARY

The present disclosure relates to an interface for inter-device communication in a battery management and protection system.

For example, in one aspect, a multi-cell battery stack includes a string of battery management and protection IC devices connected to one another in a daisy chain configuration, and a microcontroller connected to the string of battery management and protection IC devices.

In some implementations, communication between the battery management and protection IC devices can occur over differential DC isolated interfaces.

In some implementations, each battery management and protection IC device includes a communication interface circuit that includes a first pair of differential input signal lines, a first receiver including a first current comparator circuit to receive incoming differential signals on the first pair of differential input signal lines, and a first transmitter to provide outgoing differential signals on the first pair of differential input signal lines, as well as a second pair of differential input signal lines, a second receiver comprising a second current comparator circuit to receive incoming differential signals on the second pair of differential input signal lines, and a second transmitter to provide outgoing differential signals on the second pair of differential input signal lines. The communication interface circuit also can include a digital circuit block that allows signals to pass from the first receiver to the second transmitter and that allows signals to pass from the second receiver to the first transmitter.

In some implementations, the digital circuit block includes circuitry to perform digital signal decoding and includes a shift register to store incoming sampled signals, a clock recovery module, and a Manchester detector including a control unit and a plurality of logic gates. A respective pair of sampled signals in the shift register can be fed to one or more of the logic gates, and the control unit can determine whether or not the sampled signals are valid based on outputs of one or more of the logic gates and adjusts a window size for valid data based thereon. Furthermore, in some implementations, the Manchester detector is operable to generate a decoded data bit based on the sampled signals in the shift register and to determine a window size for valid data. The decoded data bit and the window size can be provided to the clock recovery module to calculate a phase shift of symbols for correction of a symbol sampling clock that is provided to the Manchester detector.

One or more of the following advantages are present in some implementations. For example, some implementations can result in a highly robust interface that is less susceptible to various types of noise and interference. In particular, some implementations can reduce the effects or occurrence of jitter, spikes and frequency deviations. Furthermore, in some implementations, communications between IC devices in a daisy chain or other configuration can be improved.

Other aspects, features and advantages will be apparent from the following detailed description, the accompanying drawings, and the claims.

DETAILED DESCRIPTION

Figures 1, 2:
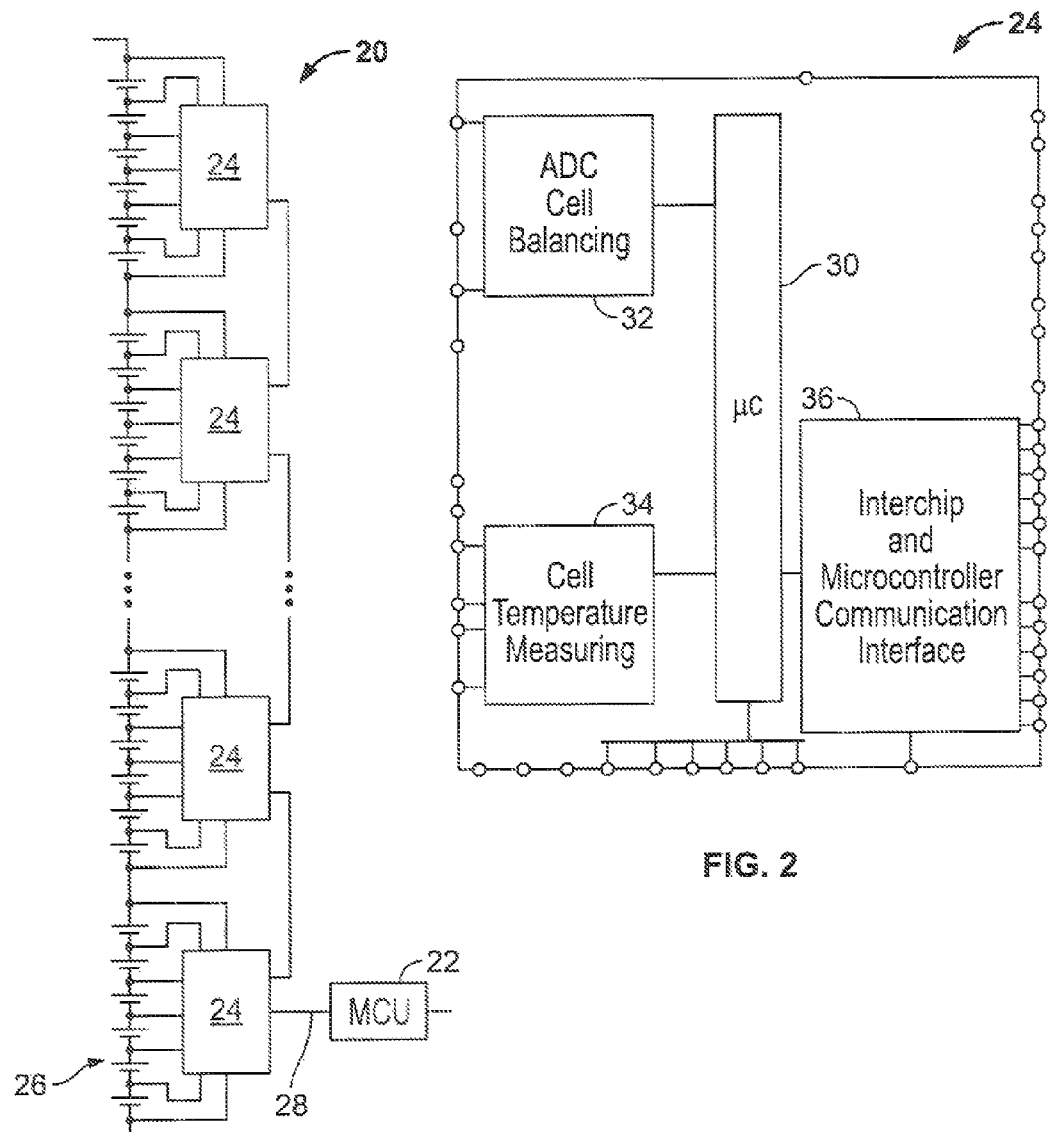
FIG. 1 illustrates a string of battery management and protection integrated circuit devices in a daisy chain configuration.
FIG. 2 is a block diagram illustrating examples of components of a battery management and protection integrated circuit device.

As shown in FIG. 1, a multi-cell battery stack 20 includes a microcontroller (MCU) 22 connected to a string of battery management and protection IC devices 24, which are connected to one another, for example, in a daisy chain configuration. In some implementations, the daisy chain can include up to sixteen IC devices 24, each of which may be implemented as a semiconductor chip; in other implementations, a different number of IC devices 24 may be included in the chain. Each battery management and protection IC device 24 may be electrically connected to one or more battery cells 26 (e.g., Li-ion (Lithium ion) battery cells).

In the illustrated example, communication with MCU 22 is carried out through the bottommost IC device 24 in the daisy chain over a serial peripheral interface (SPI) or other bus 28. The data then can be passed up the chain from one IC device 24 to the next using a communication interface implemented inside each IC device 24. Likewise, data can be passed down the chain from one IC device 24 to the next using the communication interface implemented inside each IC device 24. Thus, commands from MCU 22 are transmitted up the chain of IC device 24, and data from the IC devices is transmitted down the chain back to MCU 22. In general, MCU 22 serves as the master for initiating upstream communications; whereas the topmost IC device 24 (i.e., the IC device at the far end of the chain from MCU 22) serves as the master for initiating downstream communications.

As shown in FIG. 2, in some implementations, each IC device 24 includes its own microcontroller (μC) 30, which may be implemented, for example, as a combination of hardware and software. Device 24 also can include non-volatile memory and other circuit components integrated in a single integrated circuit. For example, some implementations may include analog-to-digital (ADC) cell balancing circuitry 32 and battery cell temperature measuring circuitry 34 to facilitate monitoring and management of various characteristics of battery cells 26. Device 24 also includes an interchip and microcontroller communication interface 36 that, among other things, allows device 24 to communicate with one or more other devices 24 in the daisy chain and, in the case of the lowest device in chain 42, to communicate directly with MCU 22. In addition, each IC device 24 includes multiple input/output pins. Device 24 also may include other components.

Figure 3:
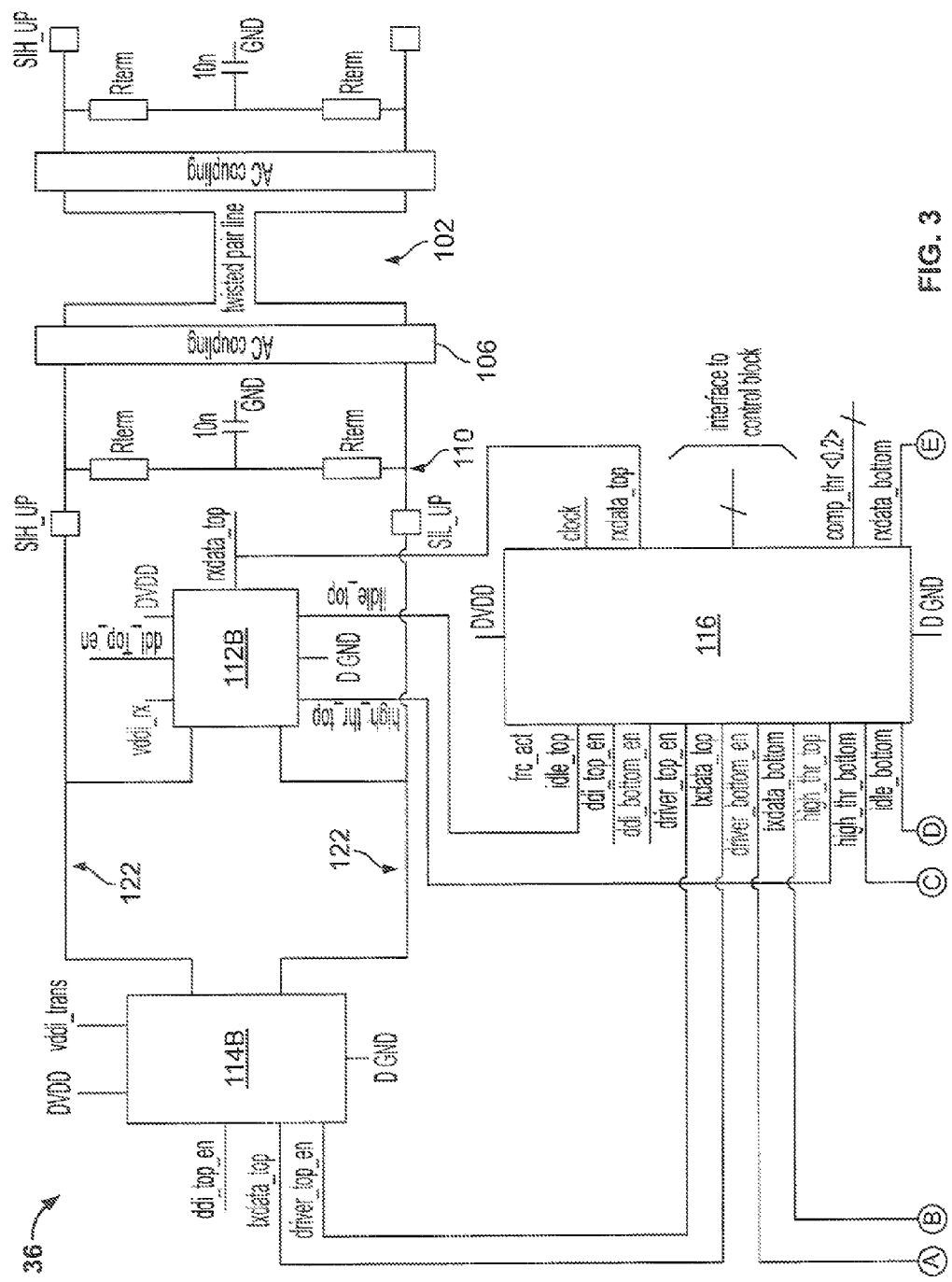
FIG. 3 is a circuit diagram of an interchip and microcontroller communication interface in the integrated circuit device of FIG. 2.
Figure 3:
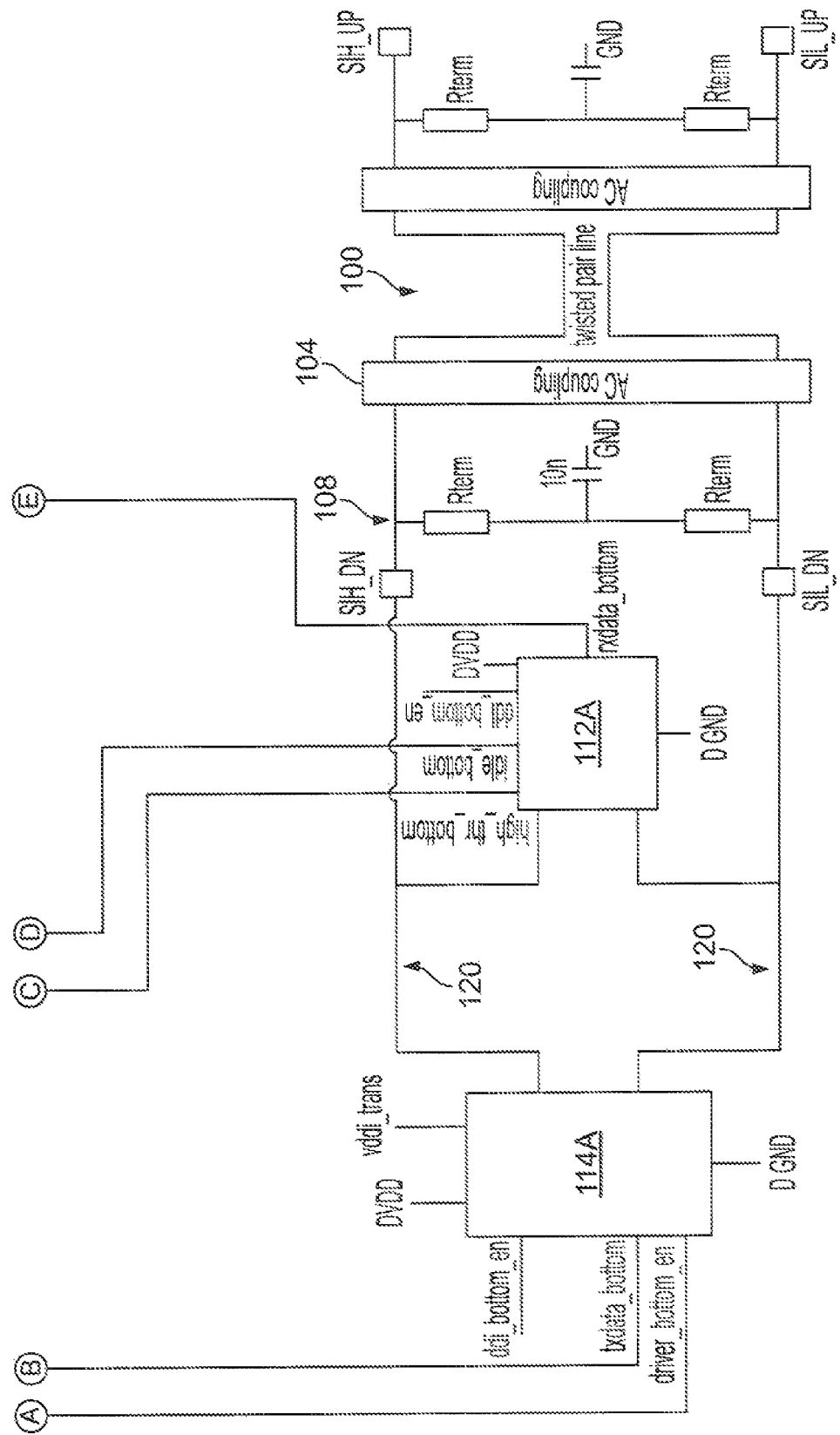

FIG. 3 illustrates various features of interchip and microcontroller communication interface 36. For example, communication between devices 24 in the chain is performed over differential DC isolated interfaces. Thus, interface 36 includes a first twisted pair line 100 that provides the interface to another device 24 in the daisy chain (e.g., the next downstream device 24). Interface 36 also includes a second twisted pair line 102 that provides a differential interface to another device 24 in the daisy chain (e.g., the next upstream device 24). Interface 36 includes AC coupling circuitry 104, 106 connected, respectively, to the twisted pair lines 100, 102. Preferably, interface 36 has low impedance termination points 108, 110, which in the illustrated example includes resistors (Rterm). For example, in a particular implementation, the termination resistors (Rterm) have a resistance of about 300 ohm so as to keep the common mode voltage below a specified voltage (e.g., 40 V) and so as to reduce the amount of current during data transmission.

Interface 36 includes analog components, such as bottom receiver 112A and bottom transmitter 114A, as well as top receiver 112B and top transmitter 114B. In addition, interface 36 includes a digital block 116 that performs functions such as Manchester encoding/decoding, hardware direction detection, data and clock recovery and idle mode timing.

For upstream transmissions (e.g., a command initiated by MCU 22), the differential signals are received over differential signal lines 120 by bottom receiver 112A, which sends the corresponding data to digital block 116 over the "rxdata_bottom" line. The data bypasses digital block 116 in a substantially transparent manner to top transmitter 114B over the "txdata_top" line. Top transmitter 114B then transmits the corresponding differential signals over differential signal lines 122 to the next upstream device 24 in the chain.

Likewise, for downstream transmissions (e.g., data from one of the devices 24), the differential signals are received over differential signal lines 122 by top receiver 112B, which sends the corresponding data to digital block 116 over the "rxdata_top" line. The data bypasses digital block 116 in a substantially transparent manner to bottom transmitter 114A over the "txdata_bottom" line. Bottom transmitter 114A then transmits the corresponding differential signals over differential signal lines 120 to the next downstream device 24 in the chain.

As shown in FIG. 3, each receiver 112A, 112B includes input pins to receive various signals. For example, as explained in greater detail below, each receiver 112A, 112B can be implemented, for example, as a low power comparator circuit. The threshold of the comparators can be switched depending, for example, on whether the receiver is operating in an idle mode or transmission mode. In the illustrated example, the high threshold of bottom receiver 112A can be set by a signal on the "high_thr_bottom" line, which is controlled by digital block 116. Another signal from digital block 116 on the "idle_bottom" line can be used to reduce current consumption of the comparator by placing the receiver 112A in an idle mode. In some implementations, a relatively high threshold of at least 750 mV can be used in the idle mode to provide robustness against interference. During transmission, a lower threshold, for example, ±150 mV, can be used. Thus, in some implementations, the magnitude of the higher threshold for the idle mode is at least five times as great as the magnitude of the lower threshold for the transmission mode.

In addition, a signal on another line "ddi_bottom_en" can be used to switch off the physical interface (e.g., receiver 112A and transmitter 114A) completely when the signal is set to LOW. In that case, the comparator pins of receiver 112A are tied to ground to protect the bias circuit from strong interference and can enable the use of external grounding of the pins. In general, the signal on the "ddi_bottom_en" line will be set high if the device 24 containing the interface 36 is not the bottommost device 24 in the stack.

Similar signals can be provided over corresponding lines ("high_thr_top," "idle top" and "ddi_top_en") to control top receiver 112B. The signal on the "ddi_top_en" line should be set to a low value if the device 24 containing the interface 36 is the topmost device 24 in the chain.

The idle mode has an idle-up condition, which is the standard mode when interface 36 is waiting for an upward data transmission, and an idle-down condition, which is the mode when interface 36 is waiting for a downward data transmission. In the idle-up condition, the "txdata_top" line (from digital block 116 to top transmitter 114B) is directly connected to the "rxdata_bottom" line (from bottom receiver 112A to digital block 116). On the other hand, in the idle-down condition, the "rxdata_top" line (from top receiver 112B to digital block 116) is directly connected to the "txdata_bottom" line (from digital block 116 to bottom transmitter 114A). The digital block 116 essentially allows the data transmissions to pass from bottom receiver 112A to top transmitter 114B, or from top receiver 112B to bottom transmitter 114A, in a transparent manner and allows for data transmissions (upward and downward) to occur with very little delay.

Figure 4:
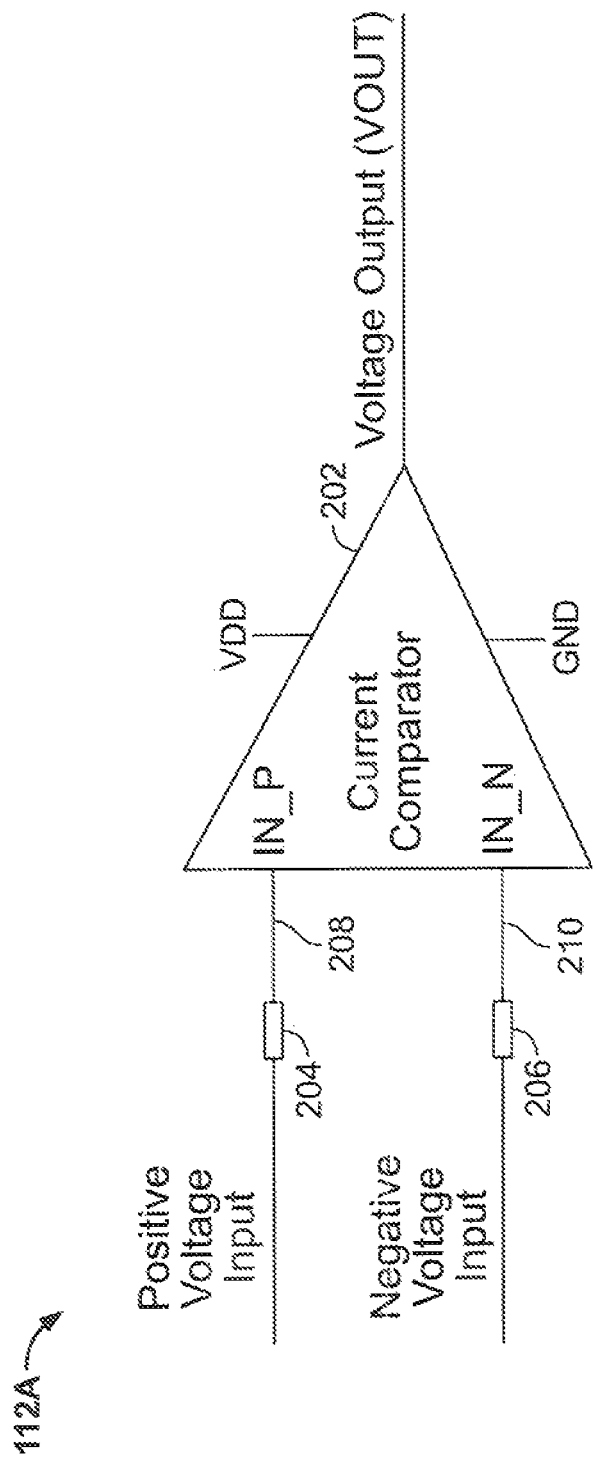
FIG. 4 illustrates further details of a receiver in the interface of FIG. 3.

Each receiver 112A, 112B can be implemented, for example, as a very low power comparator circuit with a short latency time. The comparators should be able to handle input voltages significantly greater than VDD and significantly less than ground (GND). In some implementations, VDD equals 3 V, and the input voltages can vary from greater than +20V to less than −20V. As shown in FIG. 4, each receiver (e.g., 112A) can be implemented as a current comparator 202 with low resistive inputs and resistors 204, 206. In the illustrated example, the value of each resistor 204, 206 is 500 k-ohm. The receiver 112A (or 112B) receives the differential input current signals at input terminals IN_P and IN_N over a pair of lines 208, 210.

Figure 5:
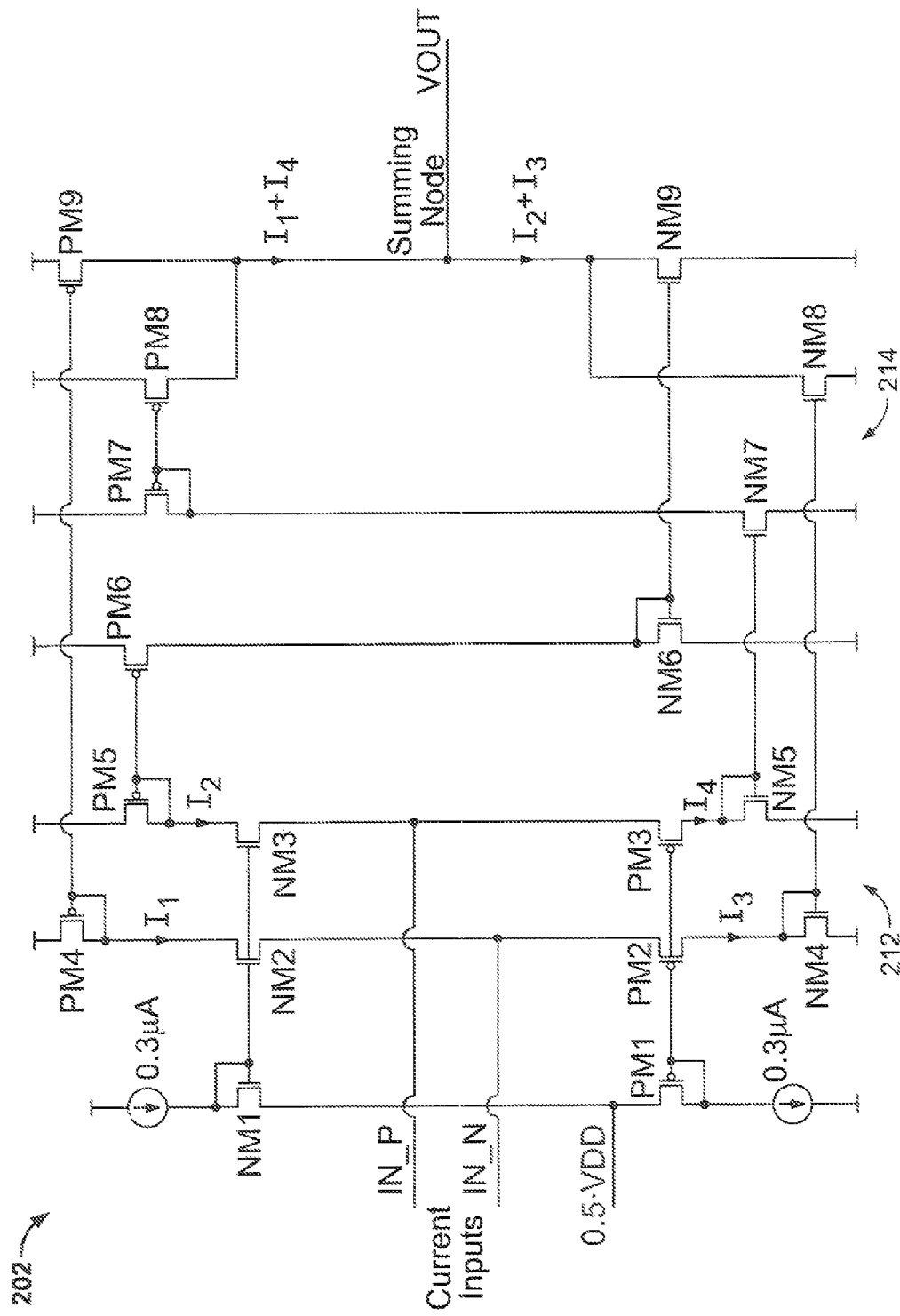
FIG. 5 illustrates further details of the current comparator in FIG. 4.

FIG. 5 illustrates details of a particular implementation of the current comparator 202. As shown in this example, the current comparator 202 includes class AB voltage output stages 212 as current inputs. MOS transistors NM2, PM2 are for the negative current input IN_N, and MOS transistors NM3, PM3 are for the positive current input IN_P. The currents I1 to I4 are transferred by current mirrors 216 (i.e., MOS transistors NM4 to NM9 and PM4 to PM9) to the summing node VOUT where the differential input current generates a digital voltage output.

The following examples illustrate operation of the current comparator 202 of FIG. 5: in some implementations. If the input current at terminal IN_P is +40 uA and the input current at terminal IN_N is +39 uA, then current I3 is 39 uA, current I4 is 40 uA, and currents I1 and I2 are zero. In the summing node, the current from the VDD side is larger, and the output voltage (VOUT) is a digital high signal. If, on the other hand, the input current at terminal IN_P is −40 uA and the input current at terminal IN_N is −39 uA, then current I1 is 39 uA, current I2 is 40 uA, and currents I3 and I4 are zero. In the summing node, the current from the GND side is larger, and the output voltage (VOUT) is a digital low signal. In the illustrated example of FIG. 5, the input voltage is not restricted by VDD or GND. Furthermore, in the illustrated example, current consumption can be very low (e.g., ≤5 uA), and the latency time of the comparator 202 can be very low (about 40 nanoseconds (ns)) when the differential input voltage is about one volt.

Each transmitter 114A, 114B in the communication interface 36 can be implemented by a driver control portion and digital push/pull output drivers. As shown in FIG. 3, each transmitter 114A, 114B includes input pins to receive various signals. For example, top transmitter 114B can receive a signal on the "driver_top-en" line from digital block 116 to activate the driver in transmitter 114B. In the illustrated implementation, the driver is activated when the bottom receiver 112A detects the beginning of an upward data transmission. Likewise, bottom transmitter 114A can receive a signal on the "driver_bottom-en" line from digital block 116 to activate the driver in transmitter 114A. In the illustrated implementation, the driver is activated as soon as the top receiver 112B indicates the beginning of downward data transmission.

The signals on the "ddi_bottom_en" line and "ddi_top_en" line can be used to switch on or off the bottom and/or top transmitters 114A, 114B, respectively. The lower transmitter 114A typically will be enabled unless the interface 36 is part of the bottommost device 24 in the stack. Likewise, the top transmitter 114B typically will be enabled unless the interface 36 is part of the topmost device 24 in the stack.

Digital block 116 also provides digital signal decoding. The illustrated implementation employs Manchester code processing, in which every symbol has a transition, i.e., the information needed for carrier sensing or synchronization. Further details of the digital block 116 relating to such functionality are described below.

Figure 6:
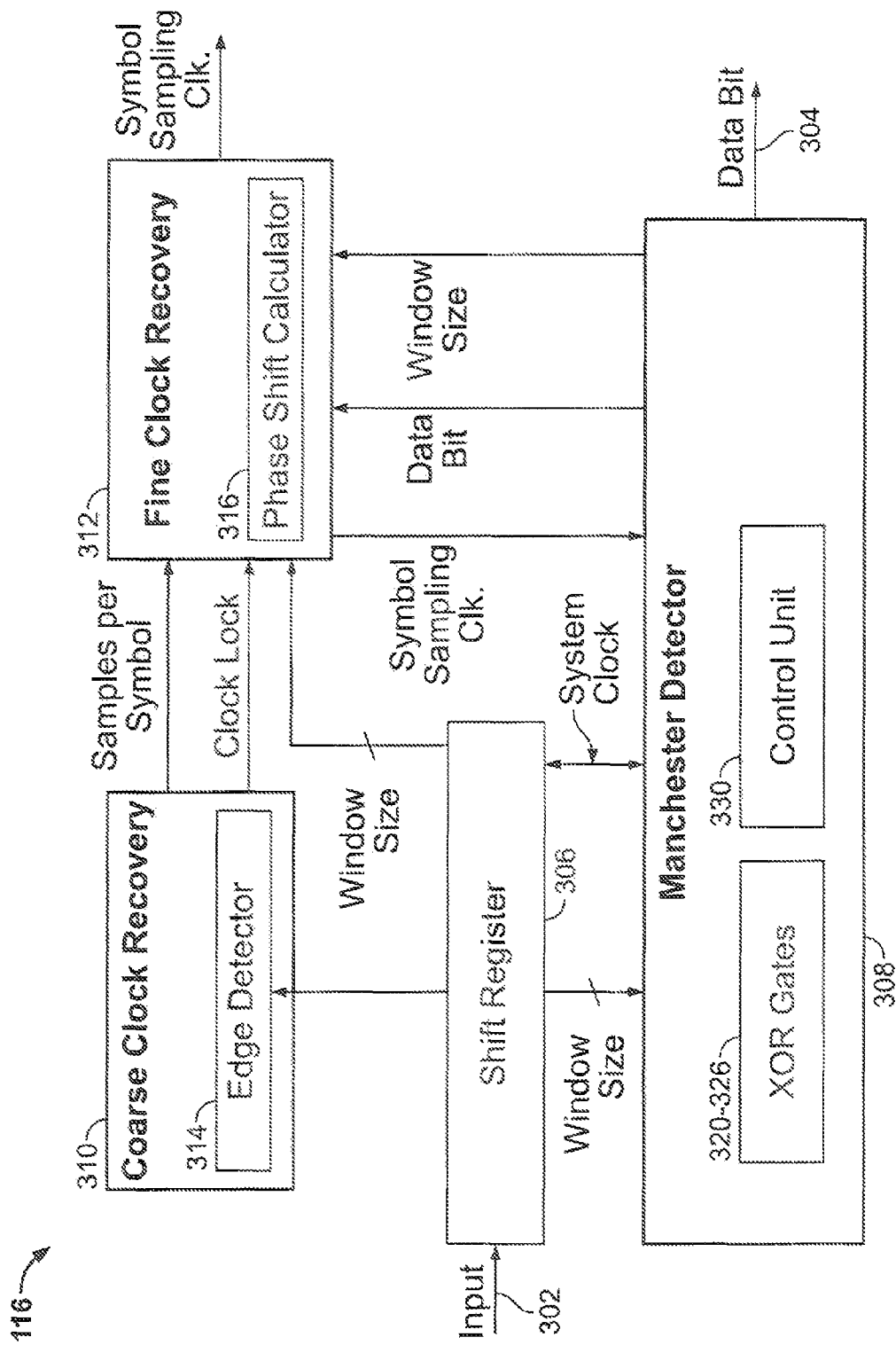
FIG. 6 is a block diagram showing further details of a digital block in the interface of FIG. 3.

As shown in FIG. 6, signals from one of the receivers 112A, 112B are received on an input line 302, which may correspond to the "rxdata_bottom" line for upward transmissions or the "rxdata_top" line for downward transmissions. The signals on the input line 302 may represent, for example, a command from MCU 22 or data from one of devices 24.

Figure 7:
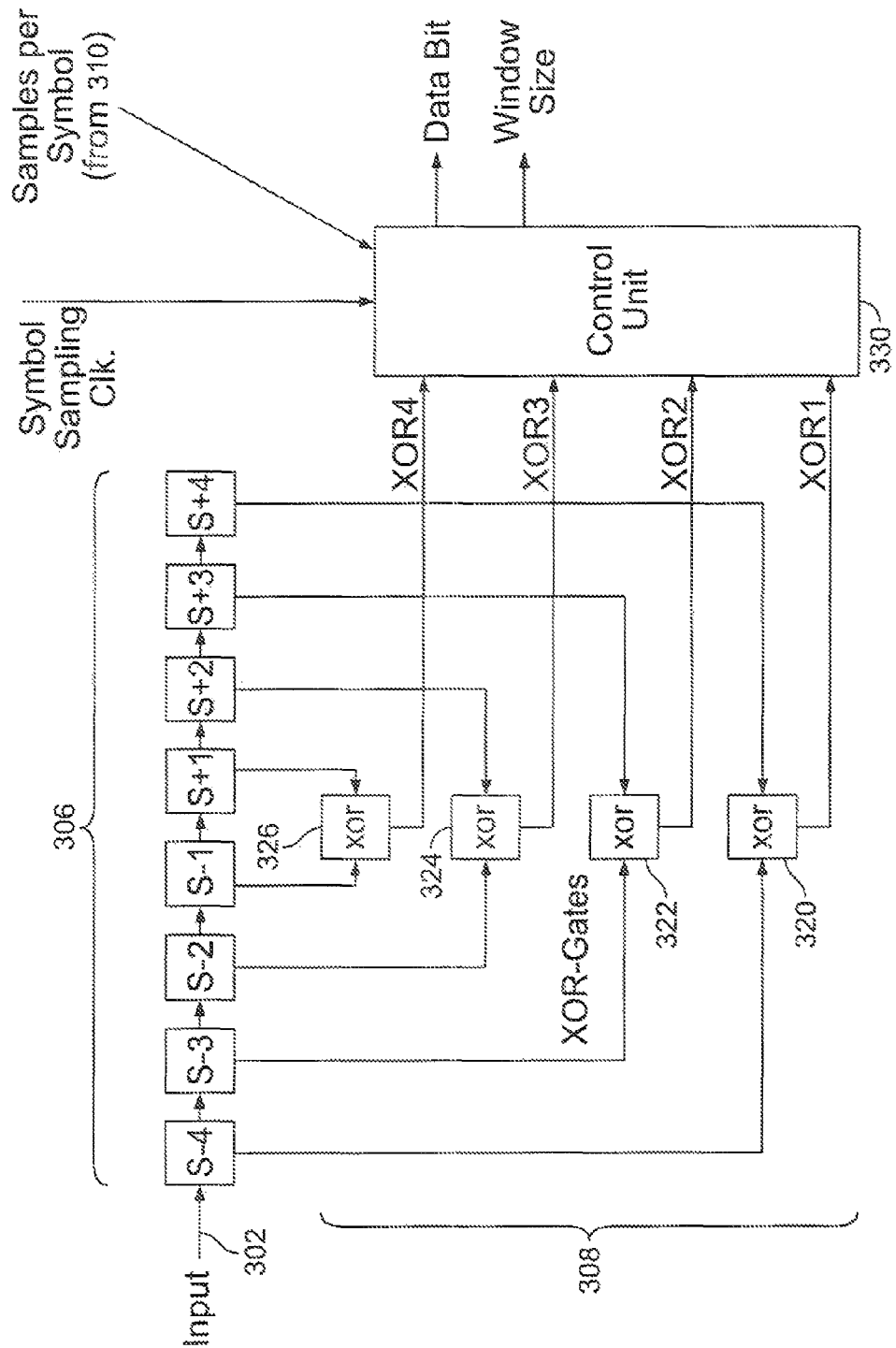
FIG. 7 illustrates further details of the Manchester detector in FIG. 6.

In the illustrated example of FIG. 6, digital block 116 includes a shift register 306, a Manchester detector 308, a coarse clock recovery module 310 and a fine clock recovery module 312. The shift register 306 stores samples of the data input to the differential interface (i.e., receiver 112A or 112B). The length of the shift register 206 depends on the oversampling rate of the system. For example, at an oversampling rate of sixteen samples per symbol, shift register 306 stores twelve to sixteen samples. In the example of FIG. 7, shift register 306 holds eight samples (i.e., S−4, S−3, S−2, S−1, S+1, S+2, S+3, S+4). If the system is synchronized, and if valid Manchester encoded signals are fed to the input of Manchester detector 308, and if the channel has no jitter, no frequency drift and no spikes, then the shift register 306 should store all 1s (or all 0s) for samples S−4, S−3, S−2, S−1 and should store all 0s (or all 1s) for samples S+1, S+2, S+3, S+4. As further illustrated in FIG. 7, Manchester detector 308 includes XOR gates 320, 322, 324, 326 and a control unit 330. A pair of samples from the shift register 306 is fed to each XOR gate. Thus, for example, samples S−4 and S+4 are fed to XOR gate 320, samples S−3 and S+3 are fed to XOR gate 322, samples S−2 and S+2 are fed to XOR gate 324, and samples S−1 and S+1 are fed to XOR gate 326. In the ideal case in which there is no jitter, frequency drift or spikes, the output of each XOR gate 320, 322, 324, 326 should be a digital high level (i.e., 1). Based on the outputs of the XOR gates, the control unit 330 can determine whether or not the samples stored by shift register 306 are valid and can adjust the window size for valid data.

As an example, in a noisy environment, the input signal may be adversely affected by different kinds of noise and interference. One challenge is noise on the voltage supply, which may adversely influence the current comparator 202 (see FIGS. 4 and 5) in the differential interface in such a way that the decision point of the comparator is shifted by a few millivolt (mV). Even such a small shift can result in a transient jitter of the input signal edges. The jitter can result in different kinds of effects on the input samples. First, samples from a previous and next Manchester symbol may be stored incorrectly in shift register 306 or may remain in shift register 306. In such a case S−4 (or S+4) would store a 1 instead of 0, or a 0 instead of a 1. Control unit 330 detects such incorrectly stored samples based on the outputs of XOR gates 320 through 326. Thus, for example, if the output of XOR gate 320 is 0 instead of 1, control unit 330 ignores samples S−4 and S+4 and uses the next sample (i.e., S−3) as the valid data bit. If the output of XOR gate 322 also is 0 instead of 1, control unit 330 ignores samples S−3 and S+3 as well, and moves to the next sample (i.e., S−2) as the valid data bit.

The symbol itself also may be affected by jitter. For example, samples S−2 and S−1 may have different values compared to S−3 and S−4, or S+1 may have a different value compared to S+2 to S+4. Such symbol jitter does not influence the functionality of the decoder 308 because the control unit 330 uses the first valid data bit it encounters. Thus, for example, if the output of XOR gate 320 is 1, the detector 308 uses sample S−4 as the valid data bit. Errors in samples S−3 to S+3 are simply ignored by the detector 308. If the output of XOR gate 320 is 0 and the output of XOR gate 322 is 1, the system is considered robust to jitter error of S−2 to S+2.

Another challenge for the Manchester detector 308 is the occurrence of spikes on the input channel. Such spikes can result in single sample errors. Such sample errors can be handled in a manner similar to the occurrence of jitter on the channel. Thus, if one sample value stored by the shift register 306 is inverted, the output of the corresponding XOR gate 322 through 326 will be 0, and the sample pair (e.g., S−4 and S+4) is ignored.

Control unit 330 thus monitors the outputs of the XOR gates 320 through 326. In the illustrated implementation, highest priority is given to the output of XOR gate 320, followed by the outputs of XOR gate 322, XOR gate 324 and XOR gate 326. The sample pair connected to the first XOR gate with an output value of 1 is the reference sample pair. Therefore, if the output of XOR gate 320 is 1, the content of sample S–4 is the valid data bit. On the other hand, if the output of XOR gate 320 is 0, and the output of XOR gate 322 is 1, then sample S–3 is the valid data bit. Likewise, if the output of XOR gate 322 also is 0, and the output of XOR gate 324 is 1, then sample S–2 is the valid data bit, and so forth.

If the clock frequencies of top receiver 112B and bottom transmitter 114A (or bottom receiver 112A and top transmitter 114B) are different from one another, the number of samples to send a symbol from the transmitter side will be different from the number of samples to capture a symbol on the receiver side. For example, if transmitter 114A has a higher clock frequency compared to receiver 112B, the oversampling rate of the receiver is lower. If, on the other hand, the transmitter clock frequency is lower, the oversampling rate at the receiver is higher. This oversampling rate (i.e., samples per symbol) is detected by coarse clock recovery module 310 and fed to the control unit 330 (see FIG. 7). Depending on the number of samples per symbol, control unit 330 deactivates or activates XOR gates 320 through 326. The output of a deactivated XOR gate is 0. For example, if transmitter 114B is much faster than the receiver clock, control unit 330 deactivates one or more XOR gates. If transmitter 114A is slower than the receiver clock, one or more XOR gates are activated by control unit 330.

The foregoing processes also allow control unit 330 to determine a valid window size, which indicates the valid observation region for phase calculations by fine clock recovery module 312. In particular, the window size should correspond to the calculated number of samples used to detect the Manchester symbol. If an XOR gate 320 through 326 is deactivated or if the output of an XOR gate is zero, then the window size is reduced by one sample at the start of shift register 306 and by one sample at the end of shift register 306. In the event the window size is 0, the Manchester detector 308 is not able to detect the symbol.

Referring back to FIG. 6, as data from receiver 112A or 112B is fed into shift register 306, an edge detector 314 in the coarse clock recovery module 310 detects and counts signal edges (i.e., transitions from 0 to 1) to calculate an average symbol timing. A clock lock signal (i.e., reset) for fine clock recovery module 312 is set if the clock recovery is successful. The average number of samples per symbol is stored in a register, and the value is provided to fine clock recovery module 312. Fine clock recovery module 312 starts a symbol sampling clock (clk), which causes Manchester detector 308 to start decoding the samples in shift register 306. The decoded data bit and the valid window size are fed back from Manchester detector 308 into fine clock recovery module 312 to calculate a phase shift of the symbols to correct the symbol sampling clk. For this purpose, fine clock recovery module 312 includes a phase shift calculator 316.

Coarse clock recovery module 310 receives samples of the data stored in shift register 306. Coarse clock recovery module 310 also provides the following outputs: a reset (clock lock) signal for fine clock recovery module 312 and the number of samples per symbol (or the number of samples for a specified number of two or more symbols).

For the coarse clock recovery of the system, it is assumed that transmitter 114A (or 114B) is sending a 0,1,0,1,0,1,0, . . . sequence, and Manchester detector 308 produces a signal with edges at (or close to) the ideal sampling points. On the receiver side, coarse clock recovery module 310 measures the average time between the edges over a longer period. After a sequence of 8-20 symbols, for example, clock is locked, and the average number of samples per symbol is stored in a register associated with fine clock recovery module 312. Depending on the accuracy requirements, the average number of samples for a specified number of two or more symbols also can be stored. To increase the robustness of course clock recovery module 310, edge detector 314 can use multiple samples to detect an edge. For example, in some implementations, six samples are used to provide robustness against a single spike before and after the symbol sampling point.

In addition to the input signals received from coarse clock recovery module 310, fine clock recovery module 312 receives the window size and the decoded data bit from Manchester detector 308. Fine clock recovery module 312 provides a symbol sampling clock (clk) as an output signal, which is used as a trigger by phase shift calculator 316 and by Manchester detector 308.

Figure 8:
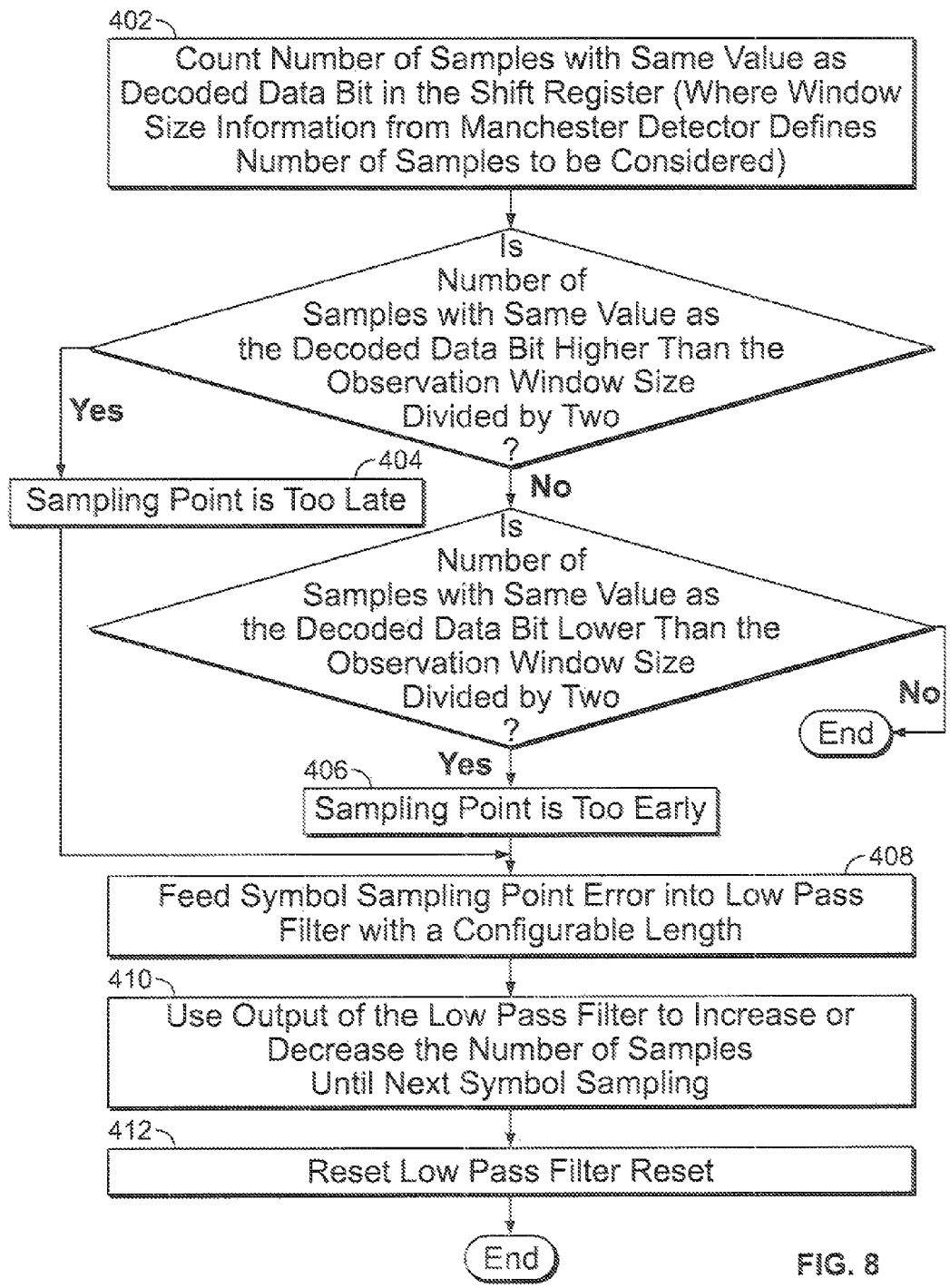
FIG. 8 is a flow chart of a method implemented by a fine clock recovery module.

Fine clock recovery module 312 calculates the phase error of the received signal with reference to the ideal symbol sampling point. As indicated in FIG. 8, this phase error can be calculated, for example, by counting the number of samples with the same value as the decoded data bit in shift register 306 (block 402). The window size information from Manchester detector 308 defines the number of samples in shift register 306 to be considered for this calculation. If the number of such samples is higher than the observation window size divided by two, the sampling point is too late (block 404). If the number of such samples is lower than the observation window size divided by two, the sampling point is too early (block 404). The symbol sampling point error can be fed into a low pass filter with a configurable length (block 408). The output of the low pass filter increases or decreases the number of samples until the next symbol sampling (block 410). After decreasing or increasing the number of samples until the next symbol sampling, the low pass filter can be reset (block 412).

The symbol sampling clock (clk) signal generated by fine clock recovery module 312 is provided as an input signal for Manchester detector 308. The other signals received as input by Manchester detector 308 include the samples stored in shift register 306, a shift register clock derived from a system clock, and the number of samples per a specified number of symbols as calculated by course clock recovery module 310. Outputs from Manchester detector 308 include the window size (i.e., the number of samples used to detect the Manchester symbol) and the decoded data bit. As noted above, the decoded data bit is provided to fine clock recovery module 312 and also can be provided to other components (e.g., a microprocessor) for further processing.

Other implementations are within the scope of the claims.

What is claimed is:

1. A battery management and protection integrated circuit comprising a communication interface circuit that comprises:
   a first pair of differential input signal lines;
   a first receiver comprising a first current comparator circuit to receive incoming differential signals on the first pair of differential input signal lines;
   a first transmitter to provide outgoing differential signals on the first pair of differential input signal lines;
   a second pair of differential input signal lines;
   a second receiver comprising a second current comparator circuit to receive incoming differential signals on the second pair of differential input signal lines;
   a second transmitter to provide outgoing differential signals on the second pair of differential input signal lines; and a digital circuit block that allows signals to pass from the first receiver to the second transmitter and that allows signals to pass from the second receiver to the first transmitter, wherein each of the first and second current comparator circuits includes:

class AB voltage output stages to generate current signals based on differential current input signals; and current mirrors to transfer the current signals generated by the class AB voltage output stages to a summing node so as to provide a digital voltage output based on the differential input current.

2. The battery management and protection integrated circuit of claim 1 wherein current consumption by each of the first and second current comparator circuits is no greater than 5 µA.

3. A battery management and protection integrated circuit comprising a communication interface circuit that comprises:

a first pair of differential input signal lines;

a first receiver comprising a first current comparator circuit to receive incoming differential signals on the first pair of differential input signal lines;

a first transmitter to provide outgoing differential signals on the first pair of differential input signal lines;

a second pair of differential input signal lines;

a second receiver comprising a second current comparator circuit to receive incoming differential signals on the second pair of differential input signal lines;

a second transmitter to provide outgoing differential signals on the second pair of differential input signal lines; and a digital circuit block that allows signals to pass from the first receiver to the second transmitter in a transparent manner and that allows signals to pass from the second receiver to the first transmitter in a transparent manner, wherein each of the first and second transmitters includes a driver control portion and digital push/pull output drivers.

4. The battery management and protection integrated circuit of claim 3 wherein each of the first and second receivers is operable in an idle mode or in a transmission mode, and wherein a respective threshold of the respective first or second current comparator circuit is switchable depending on whether the respective first or second receiver is operating in the idle mode or transmission mode.

5. The battery management and protection integrated circuit of claim 4 wherein a first threshold value is used during the transmission mode and a second threshold value, having a magnitude at least five times as great as a magnitude of the first threshold value, is used during the idle mode.

6. The battery management and protection integrated circuit of claim 4 wherein a first threshold value is used during the transmission mode and a second threshold value having a greater magnitude is used during the idle mode.

7. The battery management and protection integrated circuit of claim 6 wherein the second threshold value is at least 750 mV.

8. The battery management and protection integrated circuit of claim 4 wherein the respective threshold of the respective first or second current comparator circuit is based on a signal from the digital circuit block.

9. The battery management and protection integrated circuit of claim 3 wherein the digital circuit block is operable to provide a first enable/disable signal to turn on/off the first receiver and the first transmitter and to provide as second enable/disable signal to turn on/off the second receiver and the second transmitter.

10. The battery management and protection integrated circuit of claim 3 wherein the push/pull output drivers in the second transmitter are activated when the first receiver detects beginning of a data transmission.

11. The apparatus of claim 10 wherein the push/pull output drivers in the first transmitter are activated when the second receiver detects beginning of a data transmission.

* * * * *